United States Patent [19]

Honeycutt

[11] 4,078,869

[45] Mar. 14, 1978

[54] TWO-WAY RIGHT ANGLE DRILL

[76] Inventor: Damon P. Honeycutt, Box 233, Wallins Creek, Ky. 40873

[21] Appl. No.: 759,871

[22] Filed: Jan. 17, 1977

[51] Int. Cl.$^2$ .............................................. B23B 49/00

[52] U.S. Cl. .......................................... 408/16; 33/286

[58] Field of Search ............... 408/16, 241 R; 33/286, 33/185 R

[56] References Cited

U.S. PATENT DOCUMENTS

| | | | |
|---|---|---|---|
| 2,822,615 | 2/1958 | Durst et al. | 33/286 |
| 2,855,679 | 10/1958 | Gibble | 408/16 X |
| 3,117,480 | 1/1964 | Peddinghaus | 33/286 X |
| 3,130,633 | 4/1964 | Rantsch | 33/286 X |

*Primary Examiner*—Gil Weidenfeld

*Attorney, Agent, or Firm*—Gary C. Honeycutt

[57] ABSTRACT

A portable, hand-held drill, or an attachment therefor, comprising an assembly of parts for generating focused beams of light to be directed alongside the drill bit, whereby the positions of the light spots projected on the work surface serve as indicia of the angle between the drill bit and the work surface. In a preferred embodiment, the light beams are generated 90° apart along the circumference of a circle concentric with the bit, and normal thereto, such that perpendicularity of the bit is indicated by positioning the light spots at equal distances from the bit. It is also preferred to include means for adjusting the beam angle, such that the projections on the work surface can be located at the same distance from the tip of a short drill bit as from the tip of a long bit.

7 Claims, 5 Drawing Figures

TWO-WAY RIGHT ANGLE DRILL

This invention relates to apparatus for drilling and boring, and more particularly relates to a hand-held drill having optical guide means for assisting the operator of the drill to establish and maintain a fixed angle between the drill bit and the work surface. In one embodiment, the invention is an attachment for a hand-held drill comprising an assembly for generating focused beams of light to be directed alongside the drill bit, whereby the position of the points thereby illuminated on the work surface serve as indicia of the angle between the drill bit and the work surface.

Typically, in the operation of a portable, hand-held drill, it is desired to direct the drill perpendicularly with respect to the work surface, in order to obtain a drill hole perpendicular to the surface of the object being drilled. It is obvious that the operator cannot readily ascertain whether the drill bit is perpendiclar by viewing the bit from one direction only, since a tilt directly toward or directly away from the eye is difficult to detect with any significant degree of reliability.

Moreover, when drilling into a surface that is not freely accessable, or is not viewable from a convenient direction, it may be impossible to obtain even an approximation of perpendicularity with the unaided eye.

Accordingly, it is an object of the present invention to provide an optical guide means for a drill that projects light or other visible indicia upon a work surface to assist the drill operator in positioning the drill at a desire angle with respect to the work surface.

In general, the invention is embodied in a portable, hand-held drill, or an attachment therefor, having guide means for generating focused beams of light which project upon the work surface and thereby provide indicia for assisting the drill operator to hold the drill at a desired angle.

One embodiment of the assembly for attachment to a drill includes a collar designed to be mounted on the drill in a position which substantially surrounds or encircles a portion of the drill chuck. The collar is provided with external screw threads and keyways which interrupt the threads and extend in a direction parallel to the axis of the collar and chuck. The keyways are spaced apart 90° along the circumference of the collar.

Each keyway is provided with a light source assembly, including a base member having screw threads on its outer surface, and a central bore therethrough wherein a bulb, reflector and lenses are located and held in place by a retainer or insert.

In a preferred embodiment, each base member is pivotably mounted in its corresponding keyway, such that its pivot angle can be adjusted for the purpose of selecting an appropriate beam angle, whereby the point of projection of each beam on the work surface can remain a preselected distance from the point of a perpendicular drill bit, independently of the drill bit size. Such adjustability is required, since each bit size has a different standard length.

Figure 1:
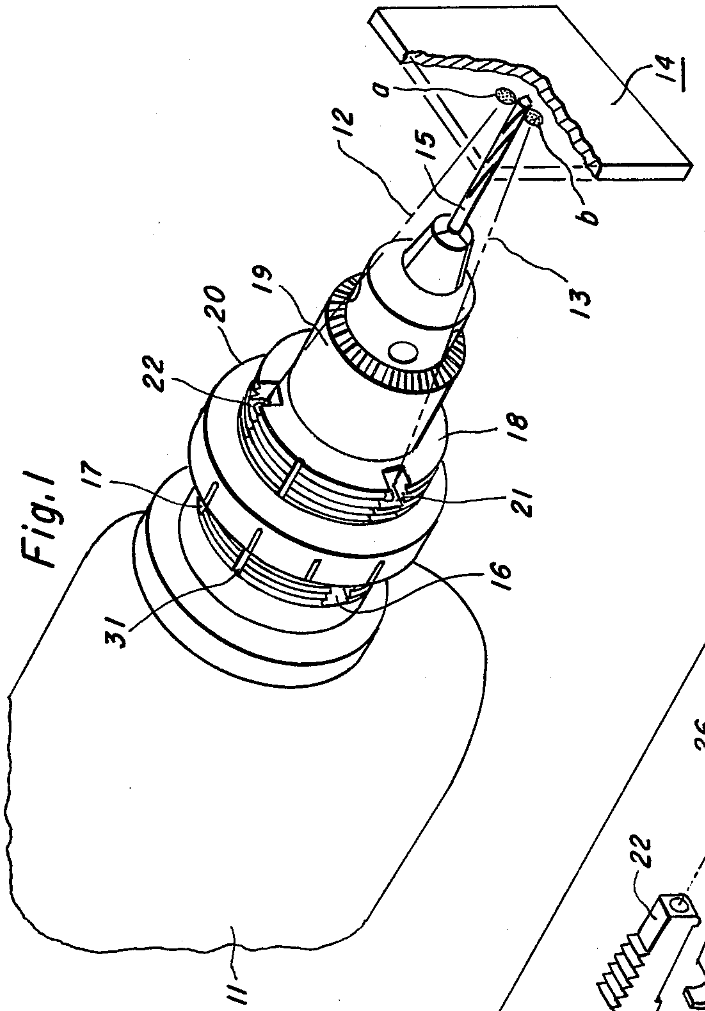
FIG. 1 is a perspective view of a drill having the attachment of the invention mounted thereon and in operation.

In FIG. 1, drill 11 is equipped with the attachment of the invention, for projecting light beams 12 and 13 on workpiece 14 to assist in determining a perpendicular position for drill bit 15 with respect to the work surface.

The attachment includes two light sources mounted within keyways 16 and 17, respectively, spaced 90° apart along the circumference of collar 18 mounted on the drill concentrically about drill chuck 19. A focusing ring 20 is rotatably mounted on collar 18 to engage light source members 21 and 22 simultaneously, to adjust beams 12 and 13 at various angles, to accommodate drill bits of different lengths. That is, as ring 20 is moved upward along collar 18, beams 12 and 13 are shifted to a smaller angle, which accommodates longer drill bits by causing projection points *a* and *b* to be located at the same preselected distance from the point of a perpendicular bit, regardless of bit length.

Figure 2:
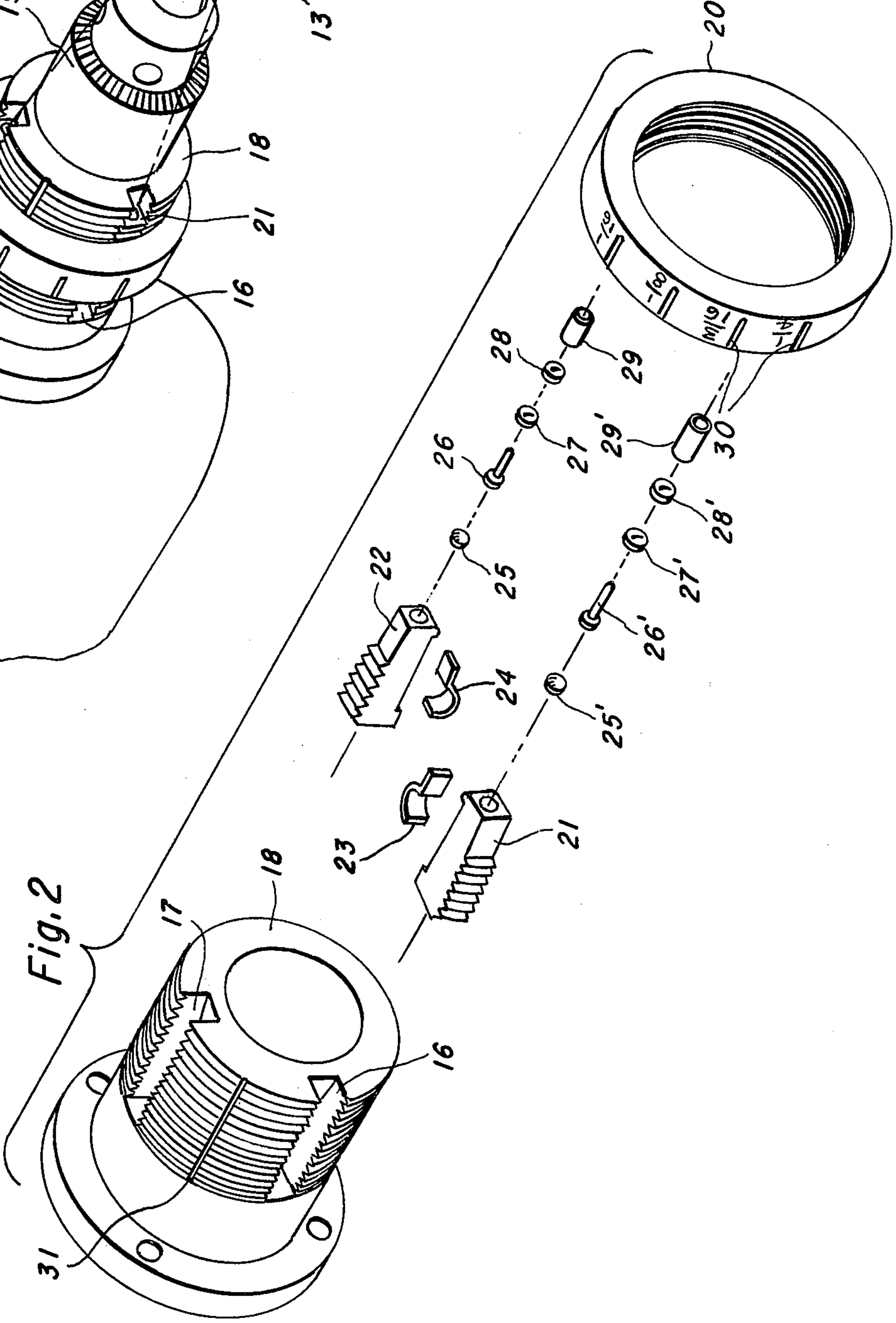
FIG. 2 is an expanded perspective view of the attachment of FIG. 1, separated from the drill.

In FIG. 2 the unassembled attachment is shown, including collar 18, keyways 16 and 17, light base members 21 and 22, leaf springs 23 and 24, light reflectors 25 and 25′, bulbs 26 and 26′, lenses 27, 28,27′ and 28′, retainers or inserts 29 and 29′, and ring 20 having graduations 30 thereon, which correspond to various drill sizes, the graduations to be set at indenture line 31 on collar 18.

Keyways 16 and 17 are tapered to provide space for springs 23 and 24 which bias members 21 and 22 in contact with ring 20. As ring 20 is moved upward along collar 18, springs 23 and 24 become more compressed, which spreads apart beams 12 and 13, for longer bits.

Figure 3:
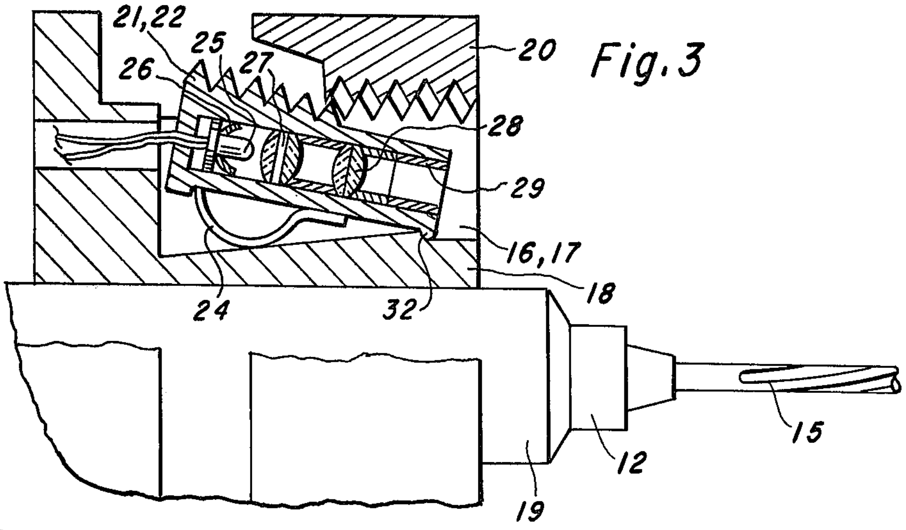
FIG. 3 is a cross section of an assembled light source of the attachment of the invention.

As shown in FIG. 3, the assembled light source, including bulb 25, reflector 26, and lenses 27 and 28, is retained within base member 22 by retainer 29. Spring 24, in cooperation with ring 20, determines the angle of member 22 about pivot point 32.

Figure 4:
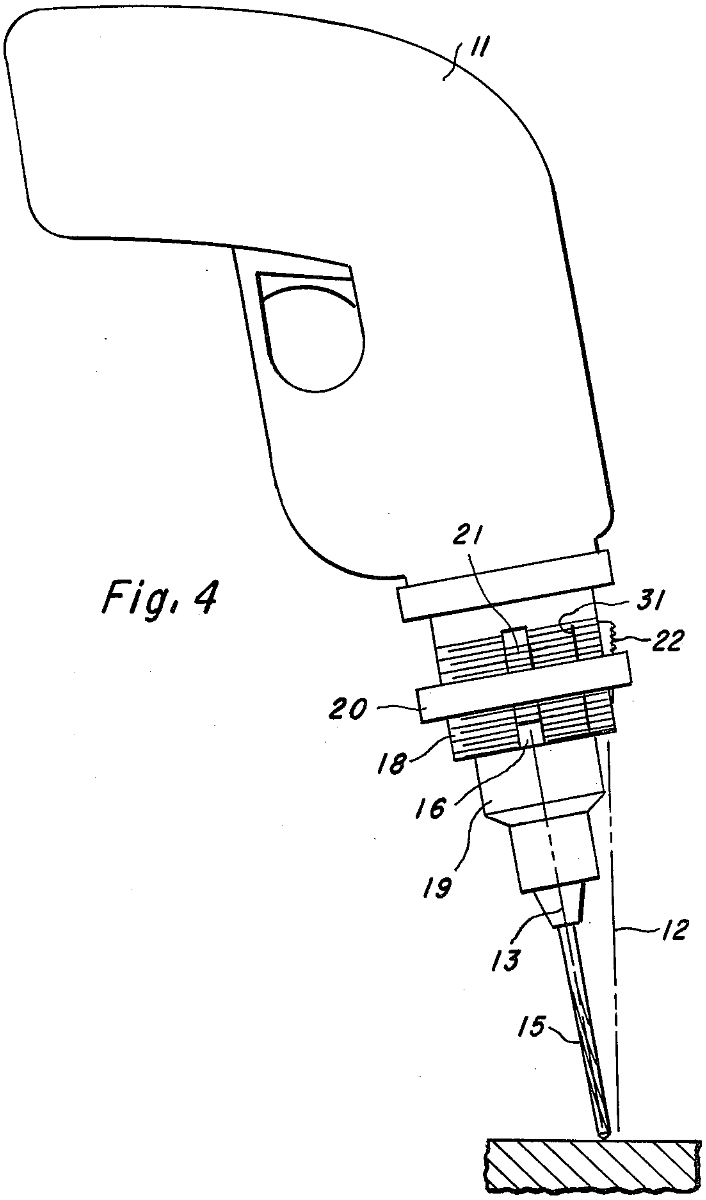
FIGS. 4 and 5 are schematic views of a drill equipped with the invention, showing the effect of drill tilt in positioning the light beam projections.
Figure 5:
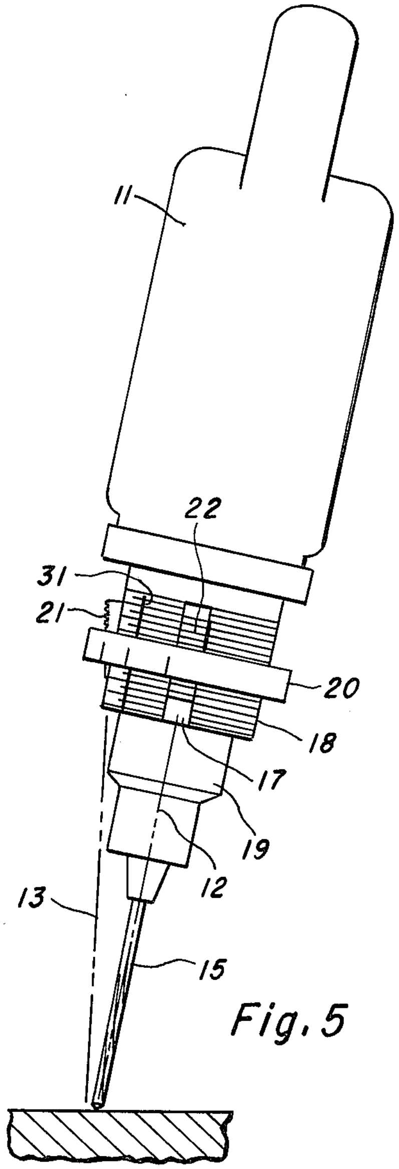

As shown in FIG. 4, tilting the drill away from beam 12 increases the distance of its projection from the tip of the bit, while the distance of the projection of beam 13 remains unchanged. On the other hand, as shown in FIG. 5, tilting the drill away from beam 13 increases the distance of its projection, without changing that of beam 12. Equal distances of the two projections from the bit tip indicate that the bit is perpendicular to the work surface.

Electrical connections are provided from bulbs 26 and 26′ to the same current source which drives the drill motor, so that the beams are energized simultaneously with the motor. In an alternate embodiment, the drill is provided with a switch having two "on" positions, the first of which energizes the lights only, and the second position energizes both the lights and the drill motor.

What is claimed is:

1. An attachment for a portable, hand-held drill comprising:
   (a) a screw-threaded collar adapted for concentric attachment to a portion of the drill chuck, said collar including a tapered keyway at each of two locations spaced apart by a 90° angle;
   (b) a first source of light in one of said keyways, in combination with means for focusing a first beam of light a preselected distance from a drill bit tip;
   (c) a second source of light in the other of said keyways, in combination with means for focusing a second beam of light said preselected distance from a drill bit tip, and spaced from said first beam 90° along the circumference of a circle concentric with the drill shaft.

2. An attachment as in claim 1 wherein each of said focusing means includes a base member shaped to fit in one of said keyways, and having screw threads to bridge the collar threads.

3. An attachment as in claim 2 wherein said focusing means also includes a screw-threaded ring surrounding said collar and engaging said base members.

4. An attachment as in claim 3 wherein each of said base members includes a central bore wherein said first and second light sources are located, respectively.

5. An attachment as in claim 4 wherein a light reflector and focusing lens are also located in each of said bores.

6. An attachment as in claim 5 wherein an insert collar is located at one end of each said bore for retaining the light source assembly in place.

7. A drill comprising:

(a) a housing;

(b) a drill chuck and motor mounted in combination with said housing;

(c) a screw-threaded collar concentrically mounted on said chuck, said collar including a tapered keyway at each of two locations spaced apart by a 90° angle;

(d) a first source of light in one of said keyways, in combination with means for focusing a first beam of light a preselected distance from a drill bit tip; and (e) a second source of light in the other of said keyways, in combination with means for focusing a second beam of light said preselected distance from a drill bit tip, and spaced from said first beam 90° along the circumference of a circle concentric with the drill shaft.

* * * * *